March 24, 1931.  J. L. McGRATH  1,797,782
SIGNAL LAMP FOR VEHICLES
Filed Feb. 14, 1925    2 Sheets-Sheet 1
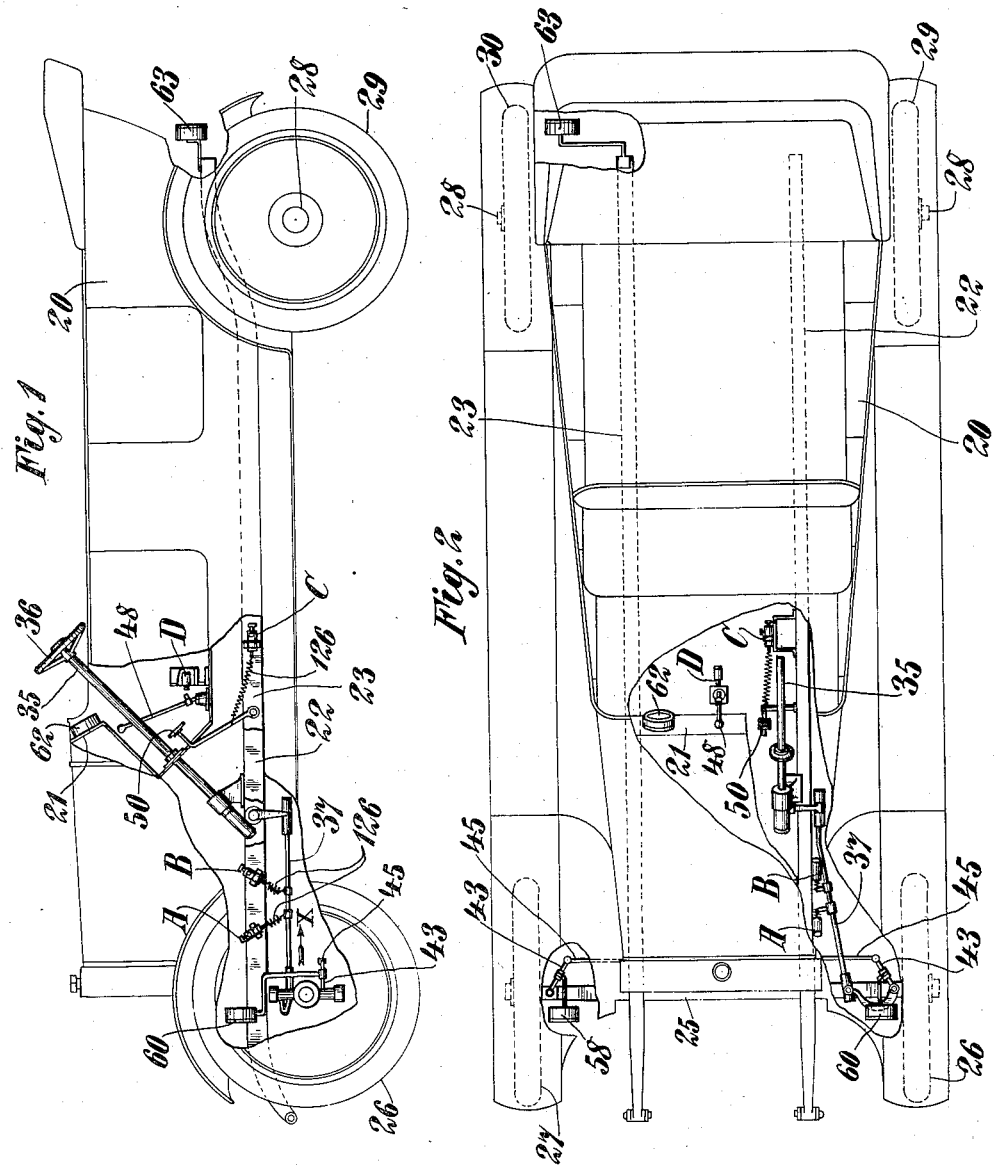
INVENTOR
John L. M<sup>c</sup>. Grath.
BY
ATTORNEY March 24, 1931.  J. L. McGRATH  1,797,782
SIGNAL LAMP FOR VEHICLES
Filed Feb. 14, 1925  2 Sheets-Sheet 2
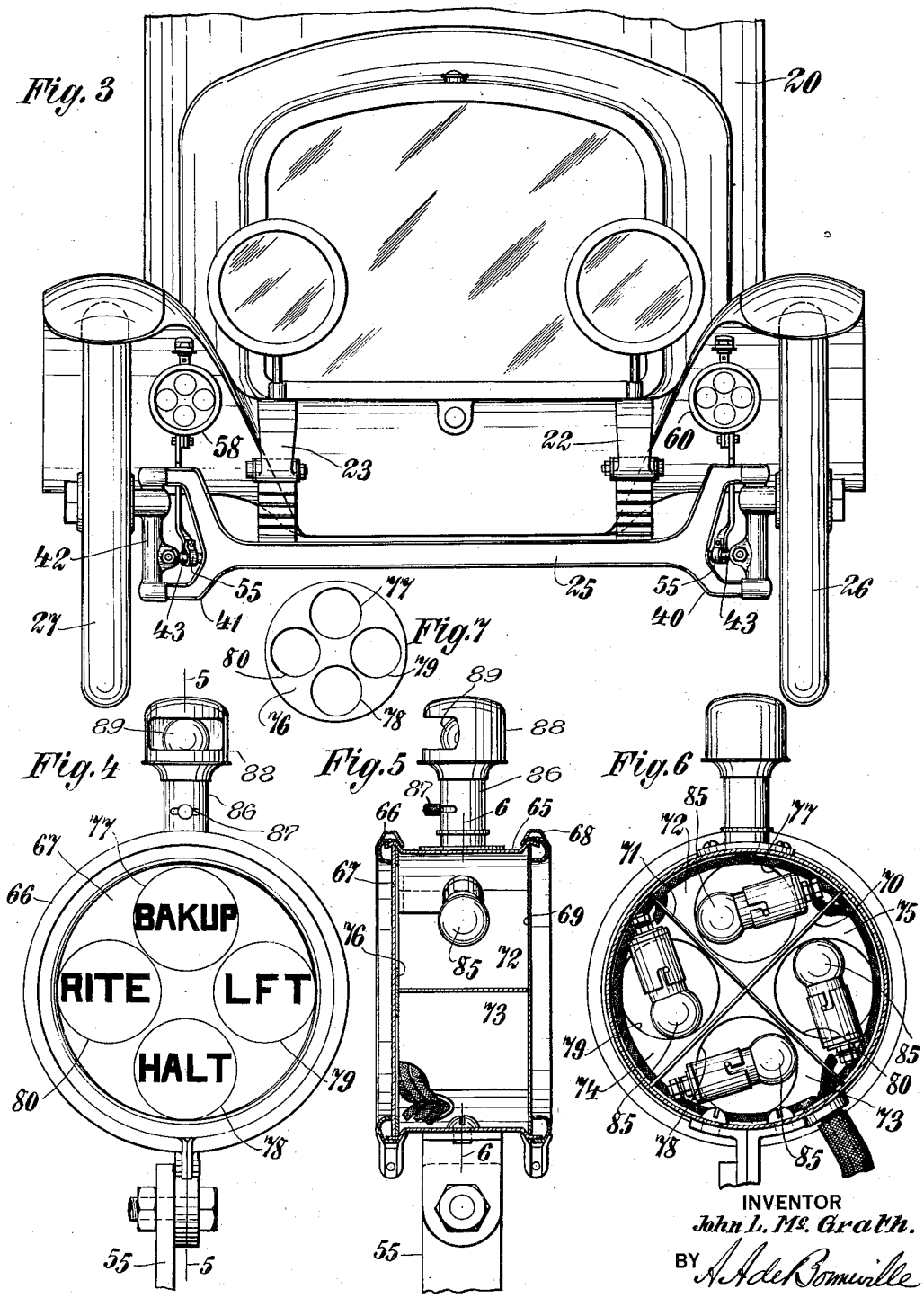

Patented Mar. 24, 1931

1,797,782

UNITED STATES PATENT OFFICE

JOHN L. McGRATH, OF ASTORIA, NEW YORK

SIGNAL LAMP FOR VEHICLES

Application filed February 14, 1925. Serial No. 9,262.

This invention relates to automatically operated signal lamps for a vehicle and is particularly adapted to automobiles.

The object of the invention is the production of signal lamps which are automatically actuated while the operator of the car is turning it to the right, left, halting or backing up, thereby avoiding accidents and avoiding the necessity of the driver operating signals to indicate the direction his car is to take, or whether it is to halt or back up.

The second object of the invention is the production of signal lamps, which swing with the turning of the vehicle to which they are attached.

The organization of the invention comprises a plurality of signal lamps mounted on the vehicle. Light chambers with electric light bulbs are provided for each lamp. The corresponding electric light bulb in each lamp coacts with an electric switch in the vehicle. Some of the electric switches are actuated by the turning of the steering wheel and the others are actuated with the oscillations of the brake lever and the shifting lever of the vehicle.

A supplemental electric light bulb may be provided for each signal lamp.

Fig. 1 represents a side elevation of the automatically operated electric light signals incorporated in an automobile; Fig. 2 shows a top plan view of Fig. 1; Fig. 3 indicates an enlarged front view of Fig. 1 partly broken away; Fig. 4 represents an enlarged view of some details of Fig. 3; Fig. 5 shows a section of Fig. 4 on the line 5, 5; Fig. 6 is a section of Fig. 5 on the line 6, 6; Fig. 7 shows an elevation of a detail on a reduced scale.

For the purpose of exemplification the signal lamps are indicated with the portions of an automobile by means of which they are operated.

An automobile is indicated with the body 20, having the dash board 21, the frame with the side members 22 and 23, the front axle 25, with the wheels 26 and 27, the rear axle 28, with the wheels 29 and 30, the steering shaft 35 with the steering wheel 36 and the steering link 37.

The front axle 25 is indicated with the usual yoke ends 40 and 41 and the steering knuckles 42. Equalizing arms 43 extend from the said knuckles and the usual equalizing bar 45 connects the ends of the arms 43. The shifting lever is indicated at 48 and the brake lever is shown at 50. The brackets 55 are detachably fastened to the arms 43 that support the electric light signal lamps 58 and 60. Similar electric light signal lamps 62 and 63 are respectively connected to the dash board 21 and to the rear end of the side member 23 of the frame of the automobile.

Each of the signal lamps comprises a casing with the cylindrical shell 65, the front frame 66 with the front glass 67, the rear frame 68 with the reflector plate 69. Reflector partitions 70 and 71 divide each signal lamp into the light chambers 72, 73, 74 and 75. To the rear of the front glass 67 is located a non-transparent disc 76 having the opening 77, opposite the chamber 72, the opening 78 opposite the chamber 73, the opening 79 opposite the chamber 74 and the opening 80 opposite the chamber 75. In each of the said light chambers is located a small electric light bulb 85. Each of the bulbs 85 is carried by a socket 86 which is rigidly attached, as by solder, to one arm of an angular bracket 87, the other arm of said bracket being attached, as by solder, to the opaque disc 76. By means of this construction, the four sockets will lie tangentially on the four sides of a square, and the bulbs will point in a counter-clockwise direction. On the front glass 67 of the signal lamp is indicated the legends, Bakup, Halt, Rite and Lft. Each of the legends is indicated on the front glass 67 opposite one of the openings in the disc 76. The legends Rite and Lft are reversed in position on the lamps for the dash board 21 and the rear end of the member 23, from the lamps 58 and 60.

A supplemental lamp for each signal lamp comprises the lamp socket 86, having the switch 87, the hood 88 and the electric light bulb 89. The socket 86 is supported on the shell 65. An independent electric circuit, not shown, connects the electric light bulbs 89.

Three similar electric switches are each designated in their entireties by the letters A, B and C and are fastened to the side member 22 of the frame of the automobile.

To use the signal lamps when the operator wishes to signal that the automobile is going to turn to the right, the steering wheel 36 through the intervention of the steering shaft 35 moves the steering link 37 in the direction of the arrow X (Figs. 1 and 10) and the switch A contacts and closes the circuit for the electric light bulbs 85, associated with the legends Rite of all the electric light signal lamps. In cast the operator wishes to signal that the automobile is going to turn to the left, the link 37 is moved in a direction opposite to said arrow X, and the switch B closes, and the electric circuit for the electric light bulb 85 associated with the legends Lft of all the lamps are energized. If the operator wants to signal that he is going to back up he moves the shifting lever 48, and thereby the electric current flows through the switch D and the electric light bulbs 85 of all the lamps associated with the legend Bakup are energized. If the operator wishes to signal, that he is going to halt or stop his car he bears on the brake lever 50 and the electric current flows through the switch C and the electric light bulbs 85 of all the lamps associated with the legends Halt are energized.

Various modifications may be made in the invention and the present exemplification is to be taken as illustrative and not limitative thereof.

Having described my invention what I desire to secure by Letters Patent and claim is:

In a vehicle signal lamp of the class described, a casing including a circular shell, a back plate therefor, a front transparent plate fitted into said shell, an opaque plate mounted in the shell in contact with the rear face of said transparent plate and provided with four apertures, a pair of diametrically arranged intersecting partitions dividing the interior of said shell into quadrant light chambers, each chamber including one of the aforesaid apertures, angular brackets engaged with said opaque plate and having an arm thereof projecting outwardly therefrom into the adjacent chamber, a socket carried on the outstanding arm of each of said brackets and arranged substantially tangential to the inner periphery of said shell, said sockets being successively disposed at right angles to one another and directed counterclockwise, and light bulbs in said sockets, as and for the purposes described.

Signed at the borough of Manhattan, city of New York in the county of New York and State of New York this 10th day of January A. D. 1925.

JOHN L. McGRATH.